United States Patent [19]

Abdelrahman

[11] Patent Number: 5,192,564
[45] Date of Patent: Mar. 9, 1993

[54] COMPOSITE DOUGH PRODUCT AND A PROCESS FOR PRODUCING SAME

[75] Inventor: Abdel Abdelrahman, St. Louis, Mo.

[73] Assignee: Continental Baking Company, St. Louis, Mo.

[21] Appl. No.: 726,427

[22] Filed: Jul. 5, 1991

[51] Int. Cl.$^5$ ............................................. A21D 10/00
[52] U.S. Cl. ....................................... 426/19; 426/21; 426/94; 426/249; 426/275
[58] Field of Search .................... 426/94, 19, 21, 275, 426/249

[56] References Cited

U.S. PATENT DOCUMENTS

| | | | |
|---|---|---|---|
| 3,372,654 | 3/1968 | Bell | 426/249 |
| 3,524,401 | 8/1970 | Hosfield et al. | 426/94 |
| 3,689,280 | 9/1972 | Werner | 426/249 |
| 3,917,856 | 11/1975 | Wong et al. | 426/19 |
| 4,711,786 | 12/1987 | Schmidt | 426/19 |
| 4,719,117 | 1/1988 | Simelunas | 426/94 |
| 4,741,907 | 5/1988 | Furuhashi | 426/94 |
| 4,892,762 | 1/1990 | Abdelrahman | 426/549 |

*Primary Examiner*—Jeanette Hunter
*Assistant Examiner*—Mary S. Mims
*Attorney, Agent, or Firm*—Virgil B. Hill

[57] ABSTRACT

The present invention describes a composite dough mass for producing a baked product comprising an inner dough portion and an outer dough portion, wherein the outer dough comprises a conventional leavened dough and the inner portion comprises a leavened dough with less oven spring than the outer dough portion. The composite material provides a means of producing a baked product of comparable quality to a product which employs only leavened dough of good baking characteristics. The present invention provides a means of adding to the inner dough portion a significant level of a fibrous additive such as soy polysaccharide or cellulosic material, to provide a bread of reduced calories, yet produce a product of acceptable oven spring bread of the composite dough material.

2 Claims, No Drawings

COMPOSITE DOUGH PRODUCT AND A PROCESS FOR PRODUCING SAME

BACKGROUND OF THE INVENTION

The present invention relates to a composite dough material and process for producing the same.

Flours used for the production of yeast leavened bread vary widely in terms of their baking performance. Flours which are of a high quality, produce breads of high loaf volume and good internal texture whereas flours that are of a lesser quality are correspondingly lower in both of these baking characteristics. The addition of a fibrous material to yeast leavened dough for producing breads or similar baked products of reduced calories, for the most part reduces the baking performance of the dough to which it is added depending on both the amount of the fibrous additive, as well as the type of additive employed. In order to overcome any shortcomings involved in the baking performance of doughs containing a fibrous additive it is not uncommon to supplement the fiber containing dough with vital wheat gluten in order to improve baking performance. While the addition of wheat gluten provides an acceptable result, wheat gluten will often lose functionality during manufacture, and may have to be added in large quantities to poor quality doughs in order to improve baking performance. This not only increases the cost of manufacture but introduces a new variable to the baking process which makes commercial use more difficult.

It would therefore be highly desirable if a means could be found of employing a poor quality dough in the production of baked goods, specifically a dough containing a significant percentage of fibrous material without a corresponding reduction in baking performance.

SUMMARY OF THE INVENTION

It was determined in an examination of the baking characteristics of conventional and poor quality doughs that the major difference between these two types of doughs during baking is expansion of the dough in the oven a baking characteristic known as oven spring. Doughs which generally have the same proof height upon being placed in the oven often have different oven spring which could be due to either the amount of gas produced or simply the amount of gas retained in the dough during oven spring. Surprisingly, it was found that doughs which have significantly different oven spring produce about the same amount of gas during heating thereby suggesting that differences in loaf volume are due primarily to gas retention. Further investigation not only confirmed the above, but indicated that oven spring or loaf volume increase is controlled for the most part by changes primarily in the outer portion or outer layers of the dough.

Based upon these observations, a composite dough mass was developed which would employ a larger percentage of poor quality dough in the interior of the dough mass and a smaller percentage of conventional or good quality dough in the outer portion of the dough mass yet still produce a baked product with acceptable oven spring. The composite dough mass of the present invention therefore comprises an inner and outer portion wherein the outer dough portion comprises a conventional leavened dough such as a yeast leavened dough with acceptable oven spring and said inner portion comprises a leavened dough with less oven spring or less desirable baking characteristics than the outer dough portion. The use of the composite dough results in a baked product of acceptable oven spring and thereby permits the use of a dough portion with poor baking characteristics. The relative proportions by weight of the outer portion of the dough mass to the inner portion comprises a weight ratio of the two sufficient to provide a baked product having oven spring substantially similar to that achieved with a conventional leavened dough of acceptable quality. Preferred weight ratios of the inner to outer portions of the dough mass comprise a weight ratio of about 4 to 1 to about 3 to 2.

The composite dough product of the present invention provides a means of incorporating a fibrous material only in the inner dough portion thereby providing a baked product of reduced calories, a desirable marketing advantage, without a corresponding reduction in oven spring or baking performance as would typically result if a significant percentage of fibrous material is incorporated in the entire dough mass.

It is therefore an object of the present invention to provide a baked product of desirable baking characteristics which incorporates a significant percentage of fibrous materials without a corresponding decreases in oven spring or baking performance.

It is also an object of the present invention to provide a dough mass which is a composite of a dough having a relatively poor baking performance and lower oven spring together with an outer dough portion comprising a conventional dough with acceptable oven spring and baking performance so that the combined or composite product has oven spring or baking performance comparable to a product composed solely of good quality dough.

DESCRIPTION OF THE PREFERRED EMBODIMENTS

The composite dough mass of the present invention comprises an inner and outer portion wherein the outer portion is a conventional leavened dough of acceptable baking performance or oven spring. The term "dough" as employed in the present invention is intended to include not only bread doughs but cake batters, cracker mixes, muffin mixes or similar types of baked products in which a leavening agent, such as yeast, is included. The present invention is particularly directed to the production of yeast leavened doughs such as are employed in the production of breads or similar baked products and the following specific description is directed primarily to this application although it will be understood by those skilled in the art the applicability of the present invention to other types of dough materials. The composite dough mass of the present invention insofar as the production of yeast leavened doughs such as breads, are typically produced on a commercial basis by what is termed as the sponge method in which a dough sponge is initially formed followed by addition of it to a dough whereas a straight dough method involves complete formation of the dough without initial formation of the dough sponge. The present invention is not intended to be limited by the specific procedure employed in production of the yeast leavened composite dough mass as described in the present invention. The procedure for production of both the inner and outer portions of the composite dough mass is essentially the same and differs only by the ingredients used in each portion.

Insofar as production of the dough by the sponge method the usual procedure is to mix the sponge ingredients in a standard mixer for approximately 4 minutes and allow the sponge to ferment for approximately 4 hours at about 86° F. The sponge is then combined with the remaining dough ingredients and mixed for approximately 10 minutes. The mixed dough is then allowed to relax for an additional 30 minutes before weighing and 10 minutes before shaping and forming into the composite dough mass of the present invention.

The following tables I and II includes typical formulations for both a standard white enriched bread as well as a typical wheat bread, either of which dough may be used as the outer dough portion of the present invention assuming it has an acceptable degree of oven spring.

TABLE I

| STANDARD WHITE ENRICHED BREAD | |
|---|---|
| Ingredients | Parts By Weight Based On 100 Pounds of Flour |
| SPONGE | |
| Wheat Flour, Patent, Enriched | 65.00 |
| Yeast | 2.50 |
| Yeast Food | 0.5 |
| Hydrated Mono- and Diglycerides | 0.75 |
| Shortening | 3.00 |
| Water | 37.00 |
| DOUGH | |
| Wheat Flour, Patent, Enriched | 35.00 |
| Salt | 2.25 |
| HFCS-42 | 10.00 |
| Soy Flour and Whey | 2.00 |
| Calcium Sulfate | 0.40 |
| Calcium Propionate | 0.50 |
| Water | 24.00 |

TABLE II

| TYPICAL WHEAT BREAD | |
|---|---|
| Ingredients | Parts By Weight Based On 100 Pounds of Flour |
| SPONGE | |
| Wheat Flour, Patent, Enriched | 65.0 |
| Yeast | 2.8 |
| Yeast Food | 0.5 |
| Wheat Gluten | 2.0 |
| Shortening | 3.0 |
| Hydrated Mono- and Diglycerides | 0.75 |
| Water | 33.0 |
| DOUGH | |
| Wheat Flour, Patent, Enriched | 10.0 |
| Whole Wheat Flour, Fine | 25.0 |
| Salt | 2.25 |
| Sucrose | 3.25 |
| Refiners Syrup | 7.00 |
| Calcium Propionate | 0.50 |
| Water | 32.0 |

The above formula represent several different types of conventional yeast leavened doughs of acceptable baking performance which can be used in the present invention as the outer layer in the composite dough mass.

The inner dough portion of the composite dough mass of the present invention, comprises a leavened dough with less desirable baking performance or specifically a lower degree of oven spring thaw the outer portion. As previously noted, a preferred aspect of the present invention is to add a fibrous material in the inner dough portion to thereby reduce the calories in the composite dough mass but without a corresponding reduction in baking performance of the composite dough mass. Therefore a typical formula for the inner dough portion of the composite dough mass of the present invention is set forth in Table III below.

TABLE III

| TYPICAL HIGH FIBER BREAD | |
|---|---|
| Ingredients | Parts By Weight Based On 100 Pounds of Flour |
| SPONGE | |
| Wheat Flour, Patent, Enriched | 60.0 |
| Shortening | 3.0 |
| Hydrated Mono- and Diglycerides | 1.0 |
| Yeast | 2.5 |
| Yeast Food | 0.65 |
| Water | 36.0 |
| Vitamin and Mineral Enrichment | (one tablet) |
| DOUGH | |
| Wheat Flour, Patent, Enriched | 40.00 |
| Sucrose | 6.67 |
| Salt | 2.0 |
| Dough Conditioner* | 0.20 |
| Calcium Sulfate | 0.47 |
| Calcium Propionate | 0.50 |
| Soy Polysaccharide | 15.0 |
| Water | 38.0 |

*Blend of enzyme active soy flour and calcium dioxide and ammonium phosphate.

As represented in the table set forth above the inner dough portion comprises a dough with an added material specifically a soy polysaccharide material, which is included in the dough to provide a level of reduced calories in the composite dough mass. The use of the fibrous material is an additive specifically in the inner dough portion of the composite dough mass provides a means of producing a composite product that has baking performance comparable to a dough which does not include the fibrous material as an additive. The fibrous material, included as an additive in the inner dough portion as set forth above, preferably comprises a soy polysaccharide material although other fibrous sources could be employed as additives in the inner dough portion of the present invention included among which are materials such as oat bran, wheat bran, cellulose or any other type of edible fibrous additive considered suitable for use in baked goods. Specifically the soy polysaccharide material, which comprises the preferred additive to the dough material of the present invention is derived from the processing of soy flakes, meal or flour into soy isolate and is sometimes referred to as the "spent flake residue" which in the past has been discarded as a waste by-product in soy isolate processing. The residual soy polysaccharide material is dried and processed to remove extraneous material and has a typical analysis after drying or a total carbohydrate content of about 80% by weight, a protein content of about 10 to 18% by weight and an ash content of about 5% by weight. The soy polysaccharide material generally comprises the many high molecular weight carbohydrate polymers contained in soybeans such as raffinose, arabinose, galactose, mannose and xylose. The term soy polysaccharide material is intended to refer to this rather complex mixture of high molecular weight carbohydrate polymers although it is employed as a collective term to describe the fibrous carbohydrate material obtained from the cell wall structural components of soybeans including soy flakes, lard and meal. Soy polysaccharide material, as employed as an ingredient for the dough material of the present invention, is dried to an ambient moisture content usually of about 7-10 percent and is employed in the present invention in this form.

A preferred type of soy polysaccharide material to be employed in the dough mass of the present invention, comprises a treated polysaccharide material wherein the soy polysaccharide material has been initially hydrated with water followed by heating to a specific temperature range for a time sufficient to improve the functionality of the treated soy polysaccharide material in baking applications. The specific procedure for production of the treated soy polysaccharide material and its use in the production of reduced calorie high fibrous baked products is specifically described in U.S. Pat. No. 4,892,762; entitled "Reduced Calorie High Fiber Bread Containing A Treated Polysaccharide Material." Typical levels of soy polysaccharide material employed in the inner dough portion of the composite dough mass of the present invention are about 5 to 25% by weight of the inner dough portion.

The inner and outer dough portions are then separately formed as described above, divided into two separate pieces are then combined at a weight ratio sufficient to produce a baked product with oven spring or baking performance comparable to that of a conventional dough of acceptable oven spring without a fibrous additive. Preferred weight ratios of the inner dough portion to the outer dough portion are about 4 to 1 to about 3 to 2.

The exact means of combining the two dough portions into the composite dough mass of the present invention is not intended to limit the present invention. The inner dough portion should be substantially enrobed by the outer dough mass since acceptable oven spring is achieved previously in the outer layers of the dough.

The following Example discloses a specific but non-limiting embodiment of the present invention.

EXAMPLE 1

A sponge/dough method was used to prepare both inner and outer doughs. The following table includes the formulas for both the inner and outer doughs.

| Ingredients | Percentage By Weight of Flour | |
|---|---|---|
| | Outer Dough | Inner Dough |
| SPONGE | | |
| Wheat Flour, Patent | 70.00 | 70.00 |
| Yeast | 2.50 | 2.50 |
| Yeast Food | 0.69 | 0.69 |
| Sodium Stearoyl Lactylate | 0.45 | 0.45 |
| Hydrated Mono- and Diglycerides | 0.75 | 0.75 |
| Vegetable Oil | 2.00 | 2.00 |
| Water | 38.90 | 38.90 |
| DOUGH | | |
| Wheat Flour, Patent | 30.00 | 30.00 |
| Salt | 2.00 | 2.00 |
| HFCS - 42 | 9.00 | 9.00 |

| Ingredients | Percentage By Weight of Flour | |
|---|---|---|
| | Outer Dough | Inner Dough |
| Soy Flour | 1.60 | 1.60 |
| Dough Conditioner | 0.20 | 0.20 |
| Calcium Sulfate | 0.42 | 0.42 |
| Oat Fiber | — | 20.00 |
| Water | 18.50 | 43.90 |

The sponge was allowed to ferment for 4 hours at 86° F. and 85% relative humidity. After the fermentation is complete, the sponge is mixed with the dough ingredients.

The mixed doughs were then divided into individuals pieces with different inner to outer dough ratios making a total of 552.8 grams per two pieces (inner and outer). The dough pieces were allowed to stand 10 minutes intermediate proof before moulding. The inner piece was then moulded into a cylinder shape and the outer dough was sheeted and wrapped around the inner piece. The dough pieces are then placed in a baking pan and proofed to $\frac{1}{2}''$ height above the pan. The dough is then baked at 430° F. for 19 minutes. Following the baking, loaf volume was measured.

The above procedure was used to prepare bread with five different inner to outer dough ratios. The ratio of inner to outer dough and the bread volume are given in the following table:

| Weight Ratio Inner/Outer Doughs | Bread Volume (cc) |
|---|---|
| 1:0 (Inner Dough) | 1850 |
| 0:1 (Outer Dough) | 3025 |
| 3:2 | 2750 |
| 3:1 | 2750 |
| 4:1 | 2625 |

The above data showed a significant improvement in bread volume at all ratios of inner/outer compared to using the inner dough alone. It is intended to include within the size of the present invention all reasonable variations, equivalents, and modifications thereto limited only by the following claims.

I claim:

1. A composite yeast leavened dough mass for the formation of bread having an effective oven spring comprising an inner dough portion and outer dough portion which enrobes said inner portion, said inner and outer dough portions comprising a weight ratio of about 4:1 to about 3:2, said outer dough comprising a yeast leavened bread dough with an effective oven spring; said inner dough comprising a yeast leavened bread dough which contains a fibrous source in an amount of 5 to 25% by weight of the inner dough thereby providing a dough with less oven spring than the outer dough portion.

2. The dough mass of claim 1 wherein said fibrous source is a soy polysaccharide material.

* * * * *